(12) United States Patent
Petro et al.

(10) Patent No.: US 7,692,653 B1
(45) Date of Patent: Apr. 6, 2010

(54) SYSTEM AND METHOD FOR PRESENTING STATISTICS

(75) Inventors: Justin B. Petro, Austin, TX (US);
Sahala Swenson, Austin, TX (US);
Aman H. Shah, Austin, TX (US)

(73) Assignee: Versata Development Group, Inc., Austin, TX (US)

(*) Notice: Subject to any disclaimer, the term of this patent is extended or adjusted under 35 U.S.C. 154(b) by 473 days.

(21) Appl. No.: 09/968,953

(22) Filed: Oct. 1, 2001

(51) Int. Cl.
*G06T 11/20* (2006.01)
(52) U.S. Cl. ........................... 345/440; 382/165
(58) Field of Classification Search ............. 345/440, 345/441, 442, 761, 762, 764; 382/165
See application file for complete search history.

(56) References Cited

U.S. PATENT DOCUMENTS

| | | | | | |
|---|---|---|---|---|---|
| 3,736,411 | A | * | 5/1973 | Berndt | 345/440 |
| 4,616,262 | A | * | 10/1986 | Toriumi et al. | 348/597 |
| 5,236,193 | A | * | 8/1993 | Ierulli | 273/252 |
| 5,333,244 | A | * | 7/1994 | Harashima | 345/419 |
| 5,442,741 | A | * | 8/1995 | Hughes et al. | 345/442 |
| 5,491,779 | A | | 2/1996 | Bezjian | 395/140 |
| 5,557,716 | A | * | 9/1996 | Oka et al. | 345/440 |
| 5,559,527 | A | * | 9/1996 | Quinn | 455/67.7 |
| 5,798,760 | A | * | 8/1998 | Vayda et al. | 345/834 |
| 5,844,572 | A | * | 12/1998 | Schott | 345/440 |
| 5,960,381 | A | * | 9/1999 | Singers et al. | 702/183 |
| 5,986,673 | A | * | 11/1999 | Martz | 345/649 |
| 6,023,261 | A | * | 2/2000 | Ugajin | 345/634 |
| 6,201,550 | B1 | * | 3/2001 | Sakamoto | 345/442 |
| 6,320,586 | B1 | * | 11/2001 | Plattner et al. | 345/700 |
| 6,326,962 | B1 | * | 12/2001 | Szabo | 345/762 |

(Continued)

FOREIGN PATENT DOCUMENTS

CH 690517 * 9/2000

(Continued)

OTHER PUBLICATIONS

Jiawei Han, Towards on-line Analytical Mining in Large Databases, 1998, Simon Fraser University, British Columbia, Canada V5A 1S6 pp. 1-11.*

(Continued)

*Primary Examiner*—Javid A Amini
(74) *Attorney, Agent, or Firm*—Hamilton, Terrile, LLP; Kent B. Chambers

(57) ABSTRACT

A plane figure presents statistics relating to data items. The plane figure includes multiple wedges which categorize a set of data items into base subsets of data items. A ring with a ring radius is displayed, and the ring radius represents a measure for at least one base subset. A corresponding wedge has a wedge radius which differs from the ring radius in proportion to a difference between the measure for that base subset and a measure for a subsidiary subset of that base subset. For example, the subsidiary subset may relate to data items for a predetermined timeframe. Boundaries, such as dividing lines, may be displayed within one or more wedges to define areas that represent additional subsets of data items. In another embodiment, a presentation space include first, second, and third groups of objects, with lines displayed between certain objects to represent flows of information between those objects.

49 Claims, 11 Drawing Sheets

U.S. PATENT DOCUMENTS

| | | | |
|---|---|---|---|
| 6,343,508 B1 * | 2/2002 | Feller | 73/159 |
| 6,359,635 B1 * | 3/2002 | Perttunen | 715/834 |
| 6,390,508 B2 * | 5/2002 | Levine | 283/115 |
| 6,448,987 B1 * | 9/2002 | Easty et al. | 715/834 |
| 6,549,219 B2 * | 4/2003 | Selker | 715/834 |
| 6,577,319 B1 * | 6/2003 | Kashiwagi et al. | 345/581 |
| 2002/0054040 A1 * | 5/2002 | Moshal et al. | 345/440 |
| 2002/0063719 A1 * | 5/2002 | Ziobro | 345/582 |
| 2002/0122072 A1 * | 9/2002 | Selker | 345/834 |
| 2004/0001608 A1 * | 1/2004 | Rhoads | 382/100 |
| 2005/0078111 A1 * | 4/2005 | Cardno et al. | 345/440 |

FOREIGN PATENT DOCUMENTS

| | | | |
|---|---|---|---|
| JP | 09-009104 | * | 8/1998 |
| JP | 10-208068 | * | 8/1998 |

OTHER PUBLICATIONS 3-dimensional pliable surfaces: for the effective presentation of visual information ,pp. 217-226, Year of Publication: 1995.*

Visualizing information spaces: Intelligent visualization and dynamic manipulation: two complementary instruments to support data exploration with GIS Gennady L. Andrienko, Natalia V. Andrienko May 1998.*

Interactive visualization of serial periodic data John V. Carlis, Joseph A. Konstan, Nov. 1998.*

A classification of visual representations Gerald L. Lohse, Kevin Biolsi, Neff Walker, Henry H. Rueter, Dec. 1994.*

A graphical comparison of RISC processors Margarita Esponda, Raúl Rojas, Sep. 1992.*

Computer Visualization graphics techniques for scientific and engineering analysis, edited by Richard s. Gallagher. 1995, pp. 275-279. ISBN 0-8493-9050-8.*

*IBM Intelligent Miner for Text*, Fact Sheet obtained from internet at <http://www-4.ibm.com/software/data/iminer/fortext/download/factsheet.pdf> 1999.

*The Trillium Control Center* (Figure) obtained from Internet at <http://www.trilliumsoft.com/softwareanim.htm> printed Feb. 6, 2001.

Gray, Jim et al., *DataCube: A Relational Aggregation Operator Generalizing Group-By, Cross-Tab, and Sub-Totals*; Microsoft Research, Advanced Technology Division, Microsoft Corporation, pp. 1-9, obtained from internet at <http://citeseer.nj.nec.com/cache/papers2/cs/12668/ftp:zSzzSzftp.research.microsoft.comzSzpubzSztrzSztr-95-22.pdf/gray96data.pdf> (printed May 7, 2001), Feb. 5, 1995 and revised Oct. 18, 1995.

Barbara, Daniel and Wu, Xintao, George Mason University, *The Role of Approximations in Maintaining and Using Aggregate Views*, IEEE Computer Society, vol. 22 No. 4, pp. 15-21, Dec. 1999.

* cited by examiner

FIG. 3B

| | | | | | 10,234 | Volume |
|---|---|---|---|---|---|---|
| View | TOP TEN | TIME LINE | AGGREGATE | FLOW | +5% | Change |

Filter By Business unit then by Industry  [Business Units ▼]  [Industry Verticals ▼]

| Top Emails > Acme | | 58 | Oct. 16, 2000 Help |
|---|---|---|---|
| 1 | L. Employee | Oct. 16, 2000. | Broadcast |
| What this place really needs is... | | | |
| 2 | R. Manager | Oct. 16, 2000. | Dev/Consulting |
| The biggest challenge facing the Dev group... | | | |
| 3 | | | |
| 4 | | | |
| 5 | | | |
| 6 | | | |
| 7 | | | |
| 8 | | | |
| 9 | | | |
| 10 | | | |

L. Employee
Sent to: 1,250     62
Replied to: 114
Strings started: 10
Total Vol. : 2,234
                Information Business unit
[Acme ▼]
Person
|A-D|E-H|I-L|M-Q|
|R-U|W-Z|
[Select Range ▼]
Topic
[Suggested ▼]
[Enter Search Query]

Time Range | mm/dd/yy
Start [      ]
End   [      ]

60

Help
                Filters

SYSTEM AND METHOD FOR PRESENTING STATISTICS

CROSS-REFERENCE TO RELATED APPLICATION

This application is related to U.S. patent application Ser. No. 09/968,766, entitled SYSTEM AND METHOD FOR EXTRACTING KNOWLEDGE FROM DOCUMENTS, filed on Oct. 1, 2001, and naming as inventors Michael Kim et al. (hereinafter "the 0110 Application"). The 0110 Application is incorporated herein by reference in its entirety.

TECHNICAL FIELD OF THE INVENTION

This invention relates in general to the field of data processing, and in particular to a system and method for presenting statistics.

BACKGROUND OF THE INVENTION

An enormous amount of information now resides in data processing systems around the world. A single large business organization, for example, typically retains millions of documents in various computer systems. In recent years, data mining systems have been developed to help extract kernels of knowledge from large collections of data. Many of those data mining systems provide important advantages in the field of data analysis. Some data mining systems also provide tools for presenting the results of statistical analyses.

For example, one well-known format that may be used to present statistical results is the pie chart. In a conventional pie chart, wedges are presented within a circle or "pie" to represent measures associated with different categories. For instance, a pie chart for government spending includes wedges for different governmental programs, such as military, social security, etc. The wedge for each program occupies a portion of the pie that corresponds to the amount spent by that program, relative to the total amount spent. Thus, a pie chart depicts statistical results involving two parameters, the category parameter and the measure parameter. In the given example, the values for the category parameter are military, social security, etc., and the values for the measure parameter are the amounts spent in each category. In the given example, the wedges thus depict a categorization of spending according to program.

Pie charts are effective for communicating statistical results that are limited to two parameters. However, standard pie charts are not designed to present results that include different values for three or more parameters. For instance, with reference to the above example, if a user is interested in understanding how government spending has changed over time, it is necessary to add a third parameter to the analysis: a time parameter. Furthermore, since a standard pie chart accommodates only two parameters, a separate pie chart must be used for each different year in the analysis. A presentation with a number of pie charts can reveal relatively large changes over time, which show up as noticeable differences between the charts. More subtle changes, however, are not readily apparent. Moreover, as the number of charts to be presented within a given presentation space increases, the size of each chart must decrease, which further reduces the ability to convey any but the most obvious of changes. Furthermore, statistical analyses frequently involve more than three parameters. For example, data mining systems may generate statistics containing summary information for many different parameters or dimensions.

In addition, much of the information that is currently stored in data processing systems relates to information that has traveled from one place or person to another place or person. When studying such information, users may gain valuable insights by considering the flow patterns for the information. For example, it is useful to know which people or departments in an organization have been communicating with which other departments or people. It is also useful to compare different parts of an organization with respect to information flow. Yet additional insight could be obtained through consideration of message content, along with statistics regarding message flow. However, such statistics are difficult to assimilate through direct study, and conventional data presentation facilities lack effective means for presenting summaries of such data.

SUMMARY OF THE INVENTION

In accordance with the present invention, a system and method are provided that substantially eliminate or reduce disadvantages and problems associated with previously developed systems and methods for presenting statistics. In an example embodiment, the system produces a plane figure such as a radial graph to depict statistics for a set of data items. Multiple wedges or slices are displayed in the plane figure to categorize the set of data items into base subsets. A ring with a ring radius is also displayed, and the ring radius represents a first measure, such as an average quantity of data items, for at least one of the wedges. In addition, that wedge has a wedge radius which differs from the ring radius in proportion to a difference between a second measure and the first measure.

For example, the wedges may categorize the data items according to distinct values for a category attribute. The radial width of each wedge may represent an aggregate measure for that wedge's base subset, in proportion to an aggregate measure for the set of items. Further, time attributes of the data items may be used to define temporal subsets of the base subsets, and the wedge radius for a wedge may differ from the ring radius to illustrate how the aggregate measure for that wedge's temporal subset differs from the normalized measure.

One or more dividing lines may also be displayed within the wedges to partition the each interior region into multiple areas. The areas represent a second categorization of each base subset, based on a supplementary parameter such as message direction or importance. For example, the lines may define sub-wedges and/or radial bands within the wedges.

In another variation, a presentation engine displays the radial graph in a user interface, while also displaying a first ordered list of topics in the user interface. The first ordered list is derived from the set of data items. In response to selection of one of the wedges, the presentation engine replaces the first ordered list of topics with a second ordered list of topics. The second ordered list is derived from the base subset associated with the selected wedge.

In a second embodiment, a presentation manager displays first and second groups of objects in respective first and second areas of a presentation space. In response to user activation of a first object in the first group, a line is displayed between the first object and a second object in the second group to depict a flow of information between the first object and the second object. In response to user activation of the second object, the presentation manager displays a third group of objects in a third area of the presentation space generally between the first area and the second area. In addition, lines are displayed between a third object in the third group and the first object and between the third object and the second object, to depict a characteristic of the flow of information between the first object and the second object. For example, the first and second objects may relate to first and second business units, and the third object may reveal something about the content of messages that have passed between those business units.

In a third embodiment, a user interface has a mechanism for selecting a different type of view to be displayed in lieu of a current view. For example, the user interface may include a selectable object, such as a tab, for retrieving each of a radial view, a flow view, a timeline view, and a list view. Various aspects are consistent across the views.

BRIEF DESCRIPTION OF THE DRAWINGS

A more complete understanding of the present invention and its objectives and advantages may be acquired by referring to the following description and the accompanying drawings, in which:

FIGS. 3A-3B depict a graphical user interface (GUI) featuring an illustrative list view;

DETAILED DESCRIPTION

Overview

Figure 1:
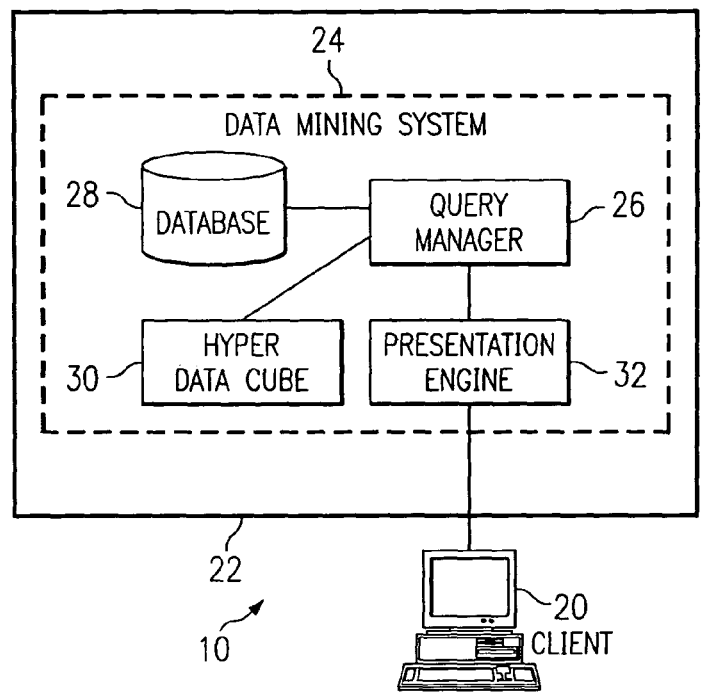
FIG. 1 presents a block diagram of an example embodiment of a collaborative data processing environment which provides visualizations such as radial graphs and flow diagrams according to the present invention.

The 0110 Application describes ways of extracting useful knowledge from sets of data. This detailed description describes a method and system for presenting the results of statistical analyses, such as those performed by the 0110 Application, in a way that allows users to quickly and easily understand the knowledge represented by those statistics. An example embodiment for presenting statistics generates different views to provide different perspectives on, and highlight different characteristics of, the underlying data. The views provide elegant visualizations that represent the data in forms that are easy to understand.

The example embodiment can provide a number of technical advantages. For example, the embodiment provides a system and method which present a unified data presentation such as radial view that accommodates a category parameter, a measure parameter, and one or more additional or supplementary parameters.

The example embodiment also provides a system and method which presents an easily understood, interactive, graphical representation of information flow, such as a flow view. The example embodiment provides the further benefit of a user interface which allows users to readily swap between various view types, such as radial views and flow views.

Another technical advantage of embodiments involving radial views is the provision of a visualization that combines the easily understood format of a conventional pie chart with enhancements that allow statistics to be displayed for three or more parameters. For instance, a radial graph according to the example embodiment represents statistics involving a category parameter, a measure parameter, and a time parameter, with different radii used for different wedges to clearly illustrate even small changes in the measure parameter for different periods of time.

Other technical advantages of flow views are that they can be used to illustrate the flow of information through various units of an organization, they are easy to understand, and they include mechanisms which allow users to compare information flow with respect to entities such as organizational units. In addition, the flow views of the example embodiment reveal further characteristics of the information, in response to user input "drilling down" on a portion or portions of the visualization. For example, a user may drill down on a particular communications path to obtain additional facts about the content of the information associated with that path.

The example embodiment also allows users to readily swap between various view types. In the example embodiment, the multiple views include a timeline view that illustrates how particular topics have waxed and waned in popularity over time and a top-topics view that displays a list of topics ranked according to importance. Additional advantages of the example embodiment include common or similar control mechanisms in the different views, which minimizes the learning curve associated with using the various views.

When applied to e-mail messages, the different views graphically portray groupings of the e-mail messages according to various parameters, present important topics extracted from the messages, illustrate flow patterns for the messages, and/or reveal topics of conversation contained within the flow patterns. In alternative embodiments, other sources of information provide the bases for the visualizations.

The views also feature controls that are easy to use and generally consistent among different view types. The controls give users the ability to interact with the views. For example, users may use the controls to explore many different aspects of the underlying data and thereby uncover additional knowledge.

Accordingly, the views allow users to understand knowledge derived from large sets of data. For example, the views can be used to organize and/or summarize e-mail databases that receive half a million or more new e-mail messages per day. The example embodiment is described in terms of a software application that provides graphical illustrations (i.e. visualizations) based on data sets. Although the example application is constructed so that it will work in any data set, regardless of the data type or theme, the visualizations in the example embodiment relate to e-mail messages of a large organization.

In particular, the example embodiment provides visualizations that represent a set of data items corresponding to an organization's e-mail messages. Each of those data items has numerous attributes, such as message topic, message time, sender, business unit of sender, recipient, and business unit of recipient. For example, each data item may be stored as a record with various fields of the record containing values for the various attributes. Alternatively, additional processing may be required to resolve one or more attributes for the data items. Nevertheless, when an attribute of a data item is used in determining the characteristics of a visualization, that attribute is considered a parameter.

Example Embodiment(s)

Referring now to FIG. 1, a collaborative data processing environment 10 provides facilities for presenting visualizations in a GUI. In the example embodiment, the GUI is displayed in a display device of a client data processing system 20, which communicates with a server data processing system 22 via a presentation engine 32. Specifically, in the example embodiment, presentation engine 32 is part of a data mining system 24, such as that described in the 0110 Application, and presentation engine 32 uses a query manager 26 to generate the visualizations based on data/statistics obtained from a database 28 and/or a hyper data cube 30. Presentation engine 32 transmits views that include those visualizations to client 20 for display. Client 20 uses a Web browser to display those views. In response to user interaction with the views, the web browser returns user input to presentation engine 32.

Data mining system 24 may be implemented, for example, in the JAVA programming language using SUN's JAVA DEVELOPMENT KIT (JDK) version 1.3. In addition, the visualizations may be implemented using JAVASERVER PAGES (JSPs) and JAVA Servlet technology. Any JSP 1.1 and Servlet 2.2 compliant application server/container, such as ALLAIRE/MACROMEDIA's JRun, may be used as the application container to host the JSPs and Servlets. Open source tools such as FLEX and JCup that aid developers in creating robust and flexible parsers in JAVA may be used to write query tools that do real-time parsing of user queries. A standard SQL92 and JDBC compliant database server, such as MICROSOFT IIS Webserver 4.0 communicating with a backend MICROSOFT SQL Server 7.0 database, may be used to deploy data mining system 24. Any available web server could be used with the preceding technology to serve web pages, provided the web server allows third party JSP/Servlet application servers to connect to it to serve the dynamic pages. It will be apparent to those of ordinary skill in the art that other technologies may be used to implement data mining system 24.

Presentation engine 32 generates different types of views to highlight different aspects of the data. However, the views present a consistent front end for user interaction. In the example embodiment, each view has two major components: the visualizations and the controls (also known as interactions). The visualizations provide users with visual representations of data sets. The controls make the visualizations easy to manipulate.

In the example embodiment, presentation engine 32 uses four views: a list view, a radial graph view, a flow view, and a timeline view. The radial graph view may also be called a radial view or an aggregate view. Each view features a different visualization that is intuitively understandable by users and incorporates unique functionality suited to that particular view.

The controls allow users to manipulate the presented data. Controls may be active or passive. Active controls allow the users to directly manipulate the data.

For example, active controls allow users to click, drag, and/or drill down directly on the visualizations the users see on the screen. Passive controls allow users to further filter or focus the information displayed on the screen. Passive controls provide functionality such as searching, filtering, and sorting.

Figure 2:
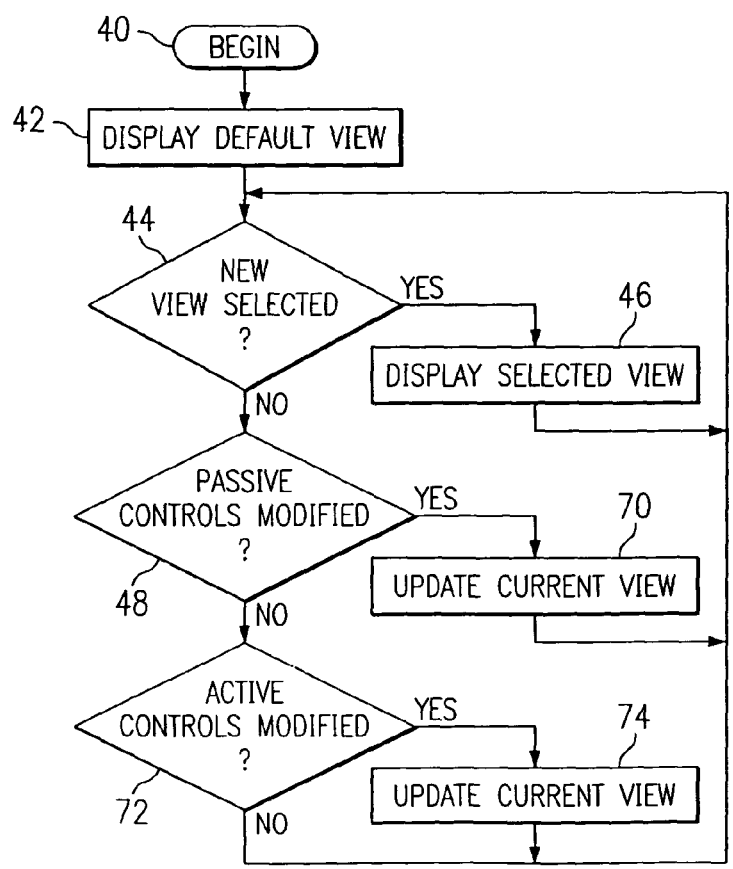
FIG. 2 presents a flowchart of an illustrative process for displaying visualizations.

Referring now to FIG. 2, an illustrative process for presenting views to users begins at block 40 with presentation engine 32 executing within server 22. At block 42, presentation engine 32 transmits a default view to a user at client 20, for example in response to the user initiating a presentation session.

Figure 3A:
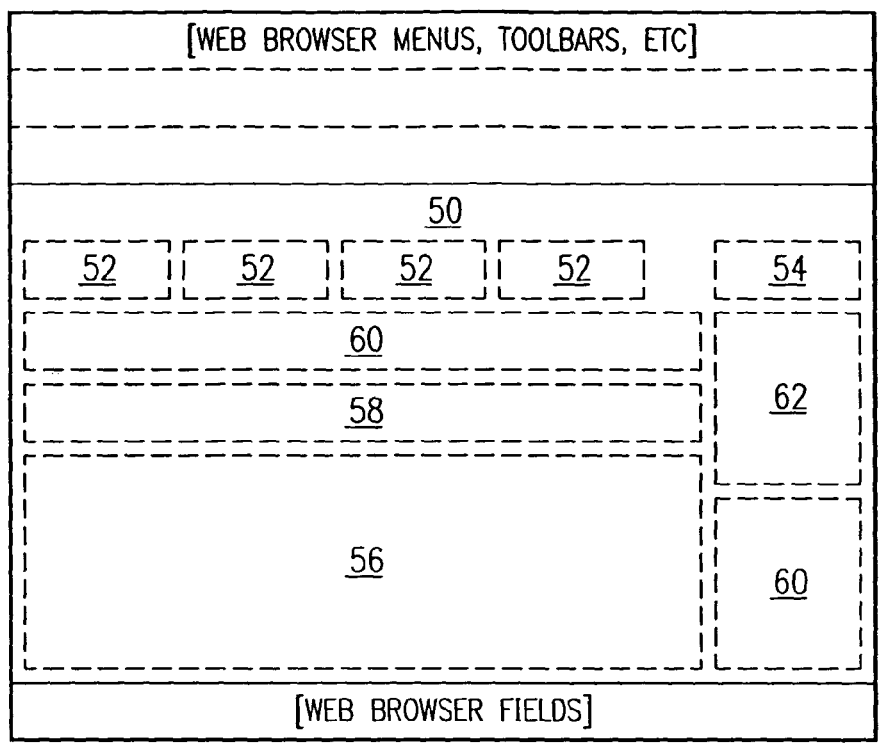

With reference also to FIGS. 3A-3B, in the example embodiment, the default view is a list view 50. List view 50 includes a tab 52 for each available view and a presentation space within which is presented a top-topics visualization 56. Top-topics visualization 56 presents a list of the ten most important topics discussed in the e-mail messages of the organization or in a particular subset of those messages. List view 50 also includes summary fields 54, which display summary information relating to the list of topics, and a heading field 58, which identifies the scope that defines the subset of e-mail messages being depicted.

Specifically, summary fields 54 include a counter showing the global aggregate volume of messages sent and received that day throughout the company. In the example, the counter reads 10,234. That is the total amount of movement on the system that day. That number is analogous to the daily stock market volume of shares traded (i.e. bought and sold). Summary fields 54 also show the percentage change from the previous day. This is represented as a percentage. The number is preceded with either a positive or negative mark to show direction. In the example, the change in volume was up five percent from the previous day.

Heading field 58 includes to two main sections: navigation and information. The information section illustrates the current date and contains a link for help. The navigation section contains two elements, the title and the "breadcrumbs". The title is serves as the label for the below visualization 56. The title and the breadcrumbs function as one unit. The breadcrumbs act as a trail through the interface. They allow the user to see where he or she has just been, while the title shows where he or she currently is. The breadcrumbs allow the user to quickly move back after drilling down on a particular item. For example, a user might drill down to: "Top Emails<BU emails<Automotive emails". The title might then read "Ford". The breadcrumbs allow that user to jump anywhere up that chain.

In addition, list view 50 includes a number of passive controls 60 which allow the user to change the focus of the presentation, for example by restricting the analysis to e-mail messages relating to a particular business unit, to e-mail messages relating to a particular topic, to e-mail messages originating within a specified time range, or to e-mail messages which include terms specified in a search query.

List view 50 also includes a highlight block 62 that displays detailed information relating to the top topic or a selected topic. For example, highlight block 62 indicates (1) which person sent the message that is highlighted in top-topics visualization 56, (2) how many people received that message, and (3) how many people responded to that message. Highlight block 62 also indicates the number of auxiliary strings originating from the highlighted message. For example, if a receiver of the original message forwarded that message to another person, the forwarded message would count as an auxiliary string. In addition, highlight block 62 includes a counter of the total amount of traffic that the first message caused.

Top-topics visualization 56 lists individual topics 63 in order of importance. In the example embodiment, importance corresponds to the volume of e-mail messages relating to each topic 63; however, in alternative embodiments, importance is based on other characteristics of the e-mail documents, such as position of the sender within the organization, etc. For each topic 63, top-topics visualization 56 also identifies the sender 64 of the original e-mail relating to that topic, the date 66 of the last posting for that topic, and the largest organizational unit 68 to have received messages for that topic.

Data mining system 24 may categorize topics by organizational units within the company. By manipulating passive controls 60 to select a desired unit of the organization, the user can cause top-topics visualization 56 to focus on information unique to that unit. For example, a user who belongs to a consulting unit of his or her company might focus all results within that business unit.

The list is organized in a tree structure, with e-mail messages grouped into topics. For example, if enough of the organization's e-mail messages discuss customer satisfaction, top-topics visualization 56 will list the topic "customer satisfaction" at the top of the list. Numerous subsidiary threads may also be aggregated into the top topic, such as threads discussing customer satisfaction with regard to particular products. The tree structure allows the user to control the level of depth of the information that is displayed in the list.

The active controls in list view 50 include drill down and roll up interaction elements. The topics themselves serve as the drill down controls. When the user clicks on a topic, top-topics visualization 56 modifies the displayed list to show one or more of the subsidiary threads pertaining to the selected topic. Additional threads can be nested within each of those subsidiary threads, and the user can eventually drill down to see individual e-mail messages. To roll up the list, the user either clicks on the first message, or uses the thread topology to move back up the hierarchy.

Referring again to FIG. 2, after displaying the default view, presentation engine 32 determines whether the user has selected a tab 52 for a different view, as indicated at block 44. If a different view has been selected, presentation engine 32 transmits the new view to client 20, as indicated at block 46. Additional types of views are described in greater detail below.

However, if no new view has been selected, presentation engine 32 determines whether the user has manipulated one of passive controls 60. If so, presentation engine 32 updates the current view accordingly, as depicted at block 70. For example, presentation engine 32 can modify the view to reflect data that has been filtered according to search criteria specified via passive controls 60.

Specifically, in the example embodiment, when the user interacts with passive controls 60, that user input is relayed to presentation engine 32 by client 20, and the new or updated views are then transmitted by presentation engine 32 back to client 20 for display to the user. In alternative embodiments, however, different architectures may be used, including architectures in which the presentation engine resides within the same data processing system that is being operated by the user.

As shown at block 72, if no passive controls 60 have been modified, presentation engine 32 determines whether any active controls have been modified. If so, the view is updated accordingly, as indicated at block 74. For example, if the user has selected a topic, that topic is expanded. Otherwise, the process returns to block 44 with presentation engine 32 awaiting user input from client 20.

Figure 4:
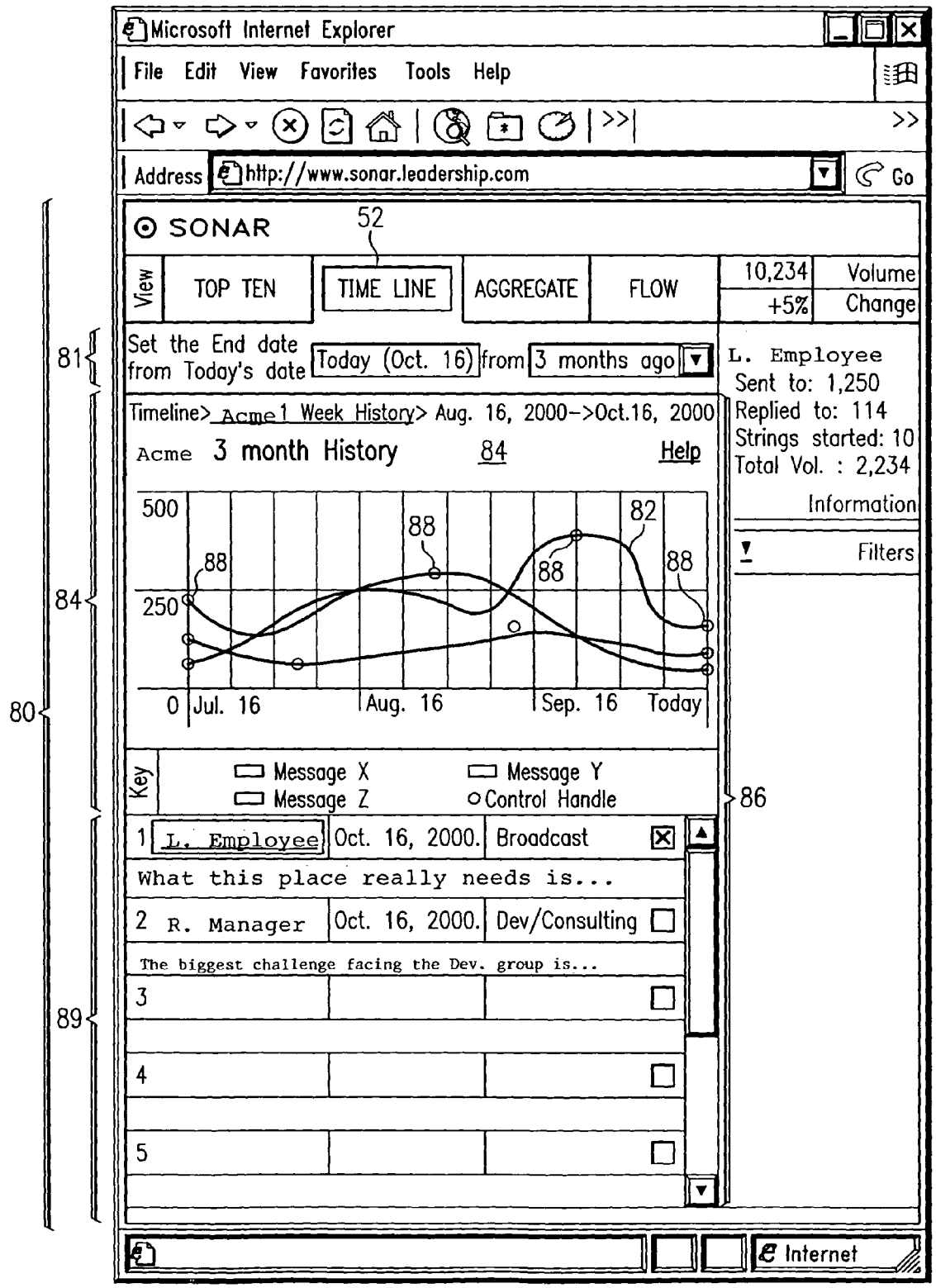
FIG. 4 depicts a GUI featuring an illustrative timeline view.

Referring now to FIG. 4, when the user selects the tab 52 for the timeline view, presentation engine 32 responds by sending a timeline view 80 to client 20. In the illustrated embodiment, timeline view 80 includes a timeline visualization 84 with lines or curves 82 for up to three e-mail topics. Lines 82 depict how the volume of information relating to each topic has changed over time. Timeline view 80 thus allows users to see how the popularity of selected topics has changed over time.

Users can set the timeframe of timeline visualization 84 by specifying start and end dates in passive controls 81. Timeline view 80 also includes active controls implemented as control points 88 on the highs and lows of each of lines 82. Selecting control points 88 allows the user to quickly drill down to important times in a topic's history. When the user elects to drill down, by clicking on a control point, a top-topics visualization 89 will display the message or string which has the most volume at the selected point on the curve.

In the example embodiment, timeline visualization 84 is displayed in an upper portion of a presentation space 86, and top-topics visualization 89 is displayed in a lower portion of presentation space 86. Users can select the topics to be graphed in timeline visualization 84 by selecting topics in top-topics visualization 89 or through a passive control such as the key word search filter.

Figure 5:
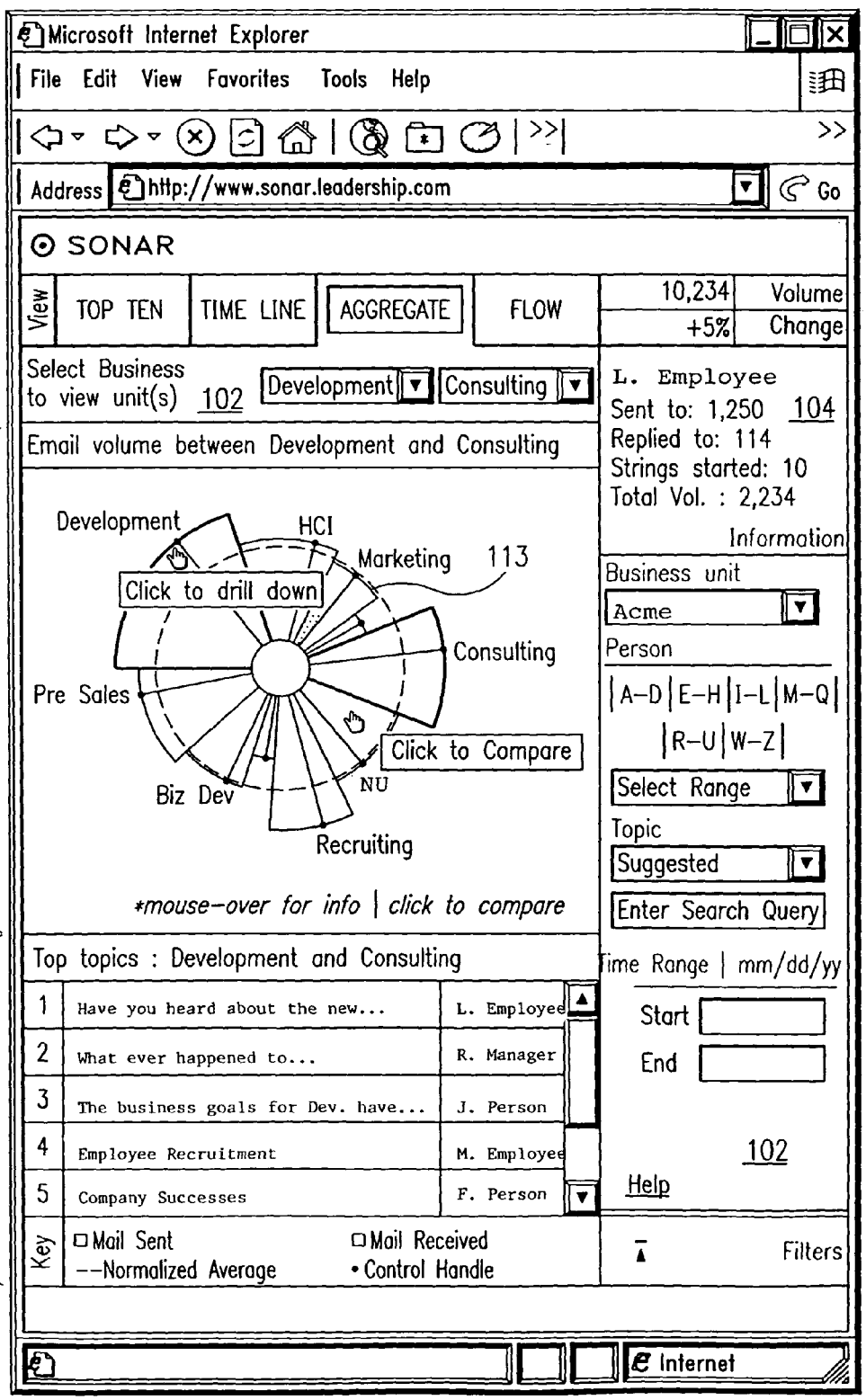
FIG. 5 depicts a GUI featuring an illustrative radial view.

With reference now to FIG. 5, when the user selects the tab 52 for the aggregate/radial view, presentation engine 32 responds by sending a radial view 100 to client 20 for display. Radial view 100 includes a radial graph 101, passive controls 102, and a highlight block 104. Passive controls 102 and highlight block 104 are generally the same as or similar to the corresponding parts of the other types views. Radial graph 101 may also be called a radial visualization or radial graph visualization.

Figure 6A:
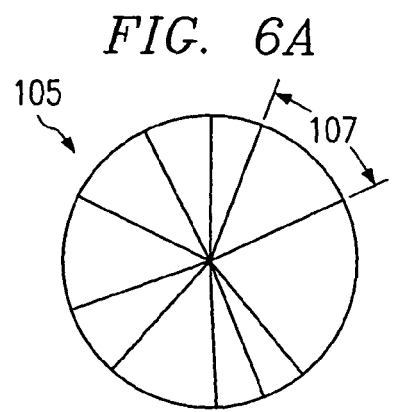
FIGS. 6A-6F depict an evolution from a pie chart to an illustrative radial graph according to the present invention.

FIGS. 6A-6F depict an illustrative evolution from a standard pie chart 105 to a radial graph 115 according to the present invention. As illustrated in FIG. 6A, pie chart 105 merely slices a circle into wedges that correspond to categories. Each wedge has a radial width 107 that reflects a measure for the corresponding category relative to an aggregate measure for all of the categories. Pie chart 105 therefore accommodates, and provides information about, no more than two parameters: category and measure. Specifically, pie chart 105 reflects the categories involved and reflects the measure for each category as a percentage of the aggregate measure. For example, if a chart represents a total of $100 in spending for various categories, and one wedge represent $25 in spending for one of the categories, that wedge would have a radial width of 90 degrees.

Like a pie chart, radial graph 115 uses wedges to show categories and uses radial widths to reflect corresponding measures. In addition, however, an example radial graph also includes a focal point 106, as highlighted in FIG. 6B. Focal point 106 defines how the information in the radial graph is to be categorized into wedges. For example, the radial graph may be categorized according to topic, business unit, person, etc.

In FIG. 5, radial graph 101 is focused on the business unit category, and the underlying data items relates to e-mail messages. In particular, each wedge corresponds to a business unit, and the radial width of each wedge reflects the total amount of e-mail associated with the corresponding business unit. For example, the radial width of the wedge 113 for the marketing department represents a count of e-mail messages having the value "Marketing Department" as a category attribute. The wedges thus represent a grouping of a set of e-mail messages into multiple subsets, based on the category parameter.

Similarly, if the user were to focus radial graph 101 on a person, presentation engine 32 would include information in the visualization that is important to that person. For example, a person may have a profile with attributes including the following: name: Jim Smith; title: Manager of Digital Marketing; Current project: Corporate Website Redesign; Team: Jane Doe, Bill Smith, John Ryan. When radial graph 101 is focused on that person, radial graph 101 ranks information associated with Jim's profile attributes, such as messages from the team members, closer to the center of the radial plot. This allows Jim Smith to quickly get to information that is important to his current state of affairs. Additionally, Jim might key sonar to look specifically for information about the corporate Website, perhaps to see if people are talking about that Website. Radial graph 101 would then prioritize that information in the stack rank.

In the illustrated embodiment, the radial widths for the wedges are determined by reference to the data set which includes all e-mail messages in data mining system 24, without regard to the time attributes of those messages. The radial widths thus depict a baseline ratio of message traffic for each business unit, relative to an aggregate amount of traffic for all business units. The message subsets for the individual wedges are therefore referred to as base subsets.

Figure 6B:
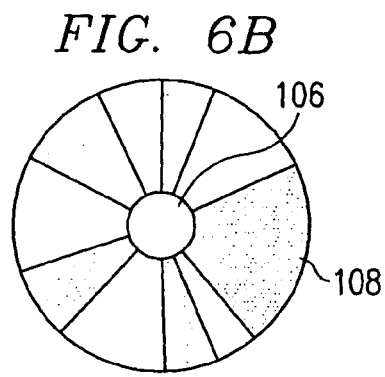
Figure 6C:
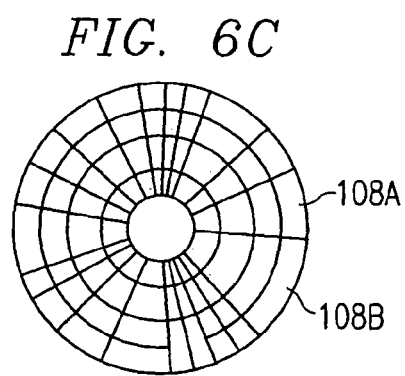
Figure 6D:
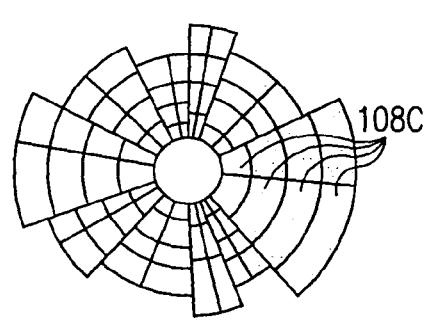
Figure 6E:
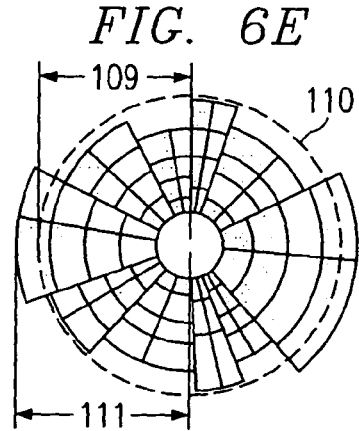

In addition, as highlighted in FIG. 6E, radial graphs 101 and 115 also feature a ring 110 which depicts a normalized measure of e-mail traffic. For example, the radius 109 of ring 110 in FIG. 6E represents the average total volume of e-mail traffic for each business unit. Ring radius 109 thus represents a normalized measure for each base subset. While ring 110 is a perfect circle, the actual value corresponding to each point on ring 110 depends on the radial wedge associated with that point. Specifically, ring 110 is normalized against each individual radial wedge. This way, a user can determine, at a quick glance, which wedges fall below and above their normal values on a particular day/week/month.

Moreover, as highlighted in FIG. 6E, each wedge has its own individual radius 111, and each such wedge radius represents the volume of e-mail for that wedge within a predetermined timeframe. The radial graphs thus also accommodate a time parameter, and users can easily compare the radii for the wedges (e.g. wedge radius 111) with ring radius 109 to determine the degree to which e-mail traffic for the predetermined timeframe differs from the baseline e-mail traffic.

For instance, in the illustrated embodiment, the default timeframe is the preceding week, and presentation engine 32 therefore determines the radius for each wedge by reference only to e-mail messages for that week. As described above, the wedges are associated with base subsets of messages for purposes of determining radial widths. By contrast to the radial widths, each wedge radius represents a subset of the corresponding base subset, with messages from the base subset filtered out if the time attributes of those messages do not fall within the preceding week. Since the data items are filtered according to a time parameter to determine the wedge radii, the subsets represented by the wedge radii are referred to as temporal subsets. Thus, as highlighted in FIG. 6E, the difference between the radius 109 of ring 110 and the radius 111 of each wedge illustrates how the volume of e-mail traffic in the last week for the corresponding business unit compares to the normalized volume.

For example, a particular radial graph may represent the total e-mails sent on a specified day by different business units, with each wedge representing one business unit. The ring radius may represent the value "seventy-five e-mails sent per day" for one business unit, and if the wedge radius for that business unit falls inside the ring radius, the user can tell that the volume of e-mail on the specified day falls significantly below the seventy-five-e-mails-per-day average (e.g. fifty e-mails).

At the same time, however, the ring radius at a wedge for a second business unit can actually correspond to an average of three hundred e-mails per day for the second business unit. Accordingly, if the wedge radius for the second business unit extends beyond the ring radius, the user can tell that the volume on the specified day exceeds the three-hundred-e-mail-per-day average (e.g. three hundred and twenty-five e-mails). Thus, users could quickly gather information about the e-mail traffic for each of the business units on the specified day, versus their normal traffic.

In addition, radial graph 101 provides one or more additional sections within the wedges to depict a sub-categorization according to one or more supplementary parameters. In the illustrated embodiment, two types of sections are used to reflect information pertaining to two additional parameters: importance and direction. Specifically, as highlighted by FIGS. 6B and 6D, each wedge 108 is divided into four radial bands 108C, and the bands closest to focal point 106 correspond to e-mail messages with the highest importance. In the illustrated embodiment, presentation engine 32 determines importance for the radial graph by reference to the time attributes of the e-mail messages, with recent messages deemed more important than older messages. In alternative embodiments, importance is determined by reference to other attributes.

In addition, as highlighted by FIGS. 6B and 6C, each wedge 108 is split into sub-wedges 108A and 108B to show how much of the e-mail was sent by the business unit and how much was received by the business unit. Radial graphs 101 and 115 thus accommodate two primary parameters (i.e. category and measure), and three supplementary parameters (i.e. time, direction and importance).

Figure 6F:
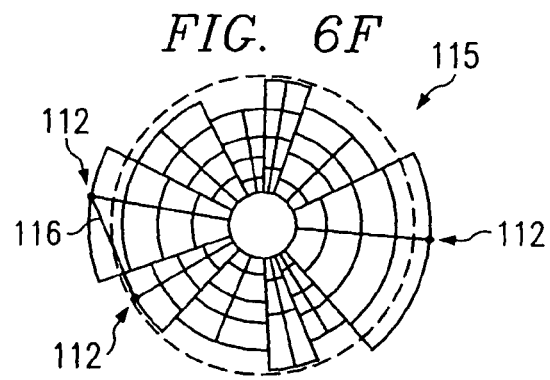

In addition, radial graph 115 provides active controls, including a control point 112 for each wedge, as highlighted in FIG. 6F. By clicking on a control point and dragging that control point closer to the focal point, the user can filter out less important data. Filtering affects what information is displayed in a top-topics section 114 of the user interface.

Similarly, if a user searches on a key term (e.g. "Auto"), top-topics section 114 will only show information that has term. The visualization would be revised accordingly, as well. For example Financial Services might have no discussions going on about Automotive, so Financial Services would drop off of the visualization.

Furthermore, the wedges themselves operate as active controls, in that if the user clicks on a wedge, data from that wedge is presented in top-topics section 114. When a wedge is selected, the user interface is also modified to change the color of that wedge.

Also, radial graph 115 allows the user to select two slices to compare. For example, to compare the e-mail flow in the consulting and development units of an organization, the user selects the two wedges for those units. In response, presentation engine 32 updates list frame 114 to display data from the selected organizational units only.

In addition, if the user clicks and drags between the control points of two wedges, presentation engine 32 re-articulates radial graph 115 based solely on the data for the two selected units. For example, line 116 in FIG. 6F depicts a user clicking and dragging between wedge control points. In response to completion of that action, presentation engine 32 reconfigures radial graph 115 to include only two wedges. In the reconfigured radial graph, presentation engine 32 gives the ring a radius which reflects an aggregate measure for the two selected units without regard to time attributes and gives the wedges for those units radii which reflect respective measures of e-mail traffic for the predetermined timeframe.

For example, a user may be looking at a plot of all the industry-aligned business units of the company. Those business units might be Auto, Computer, Financial Services, Healthcare, etc. The user might then want to compare Auto and Computer. To do so, the user could drag from a point on the wedge for Auto and a point on the wedge for Computer. In response, the entire graph would change to show only the units within Computer and Auto.

In this case those units might be functional units like Development, Consulting, Marketing, etc. The user could keep drilling down to these departments. The interface gives the user options to drill down both across vertical sections (e.g. Computer to Auto) and internally in a section (e.g. Consulting to Development).

Figure 7:
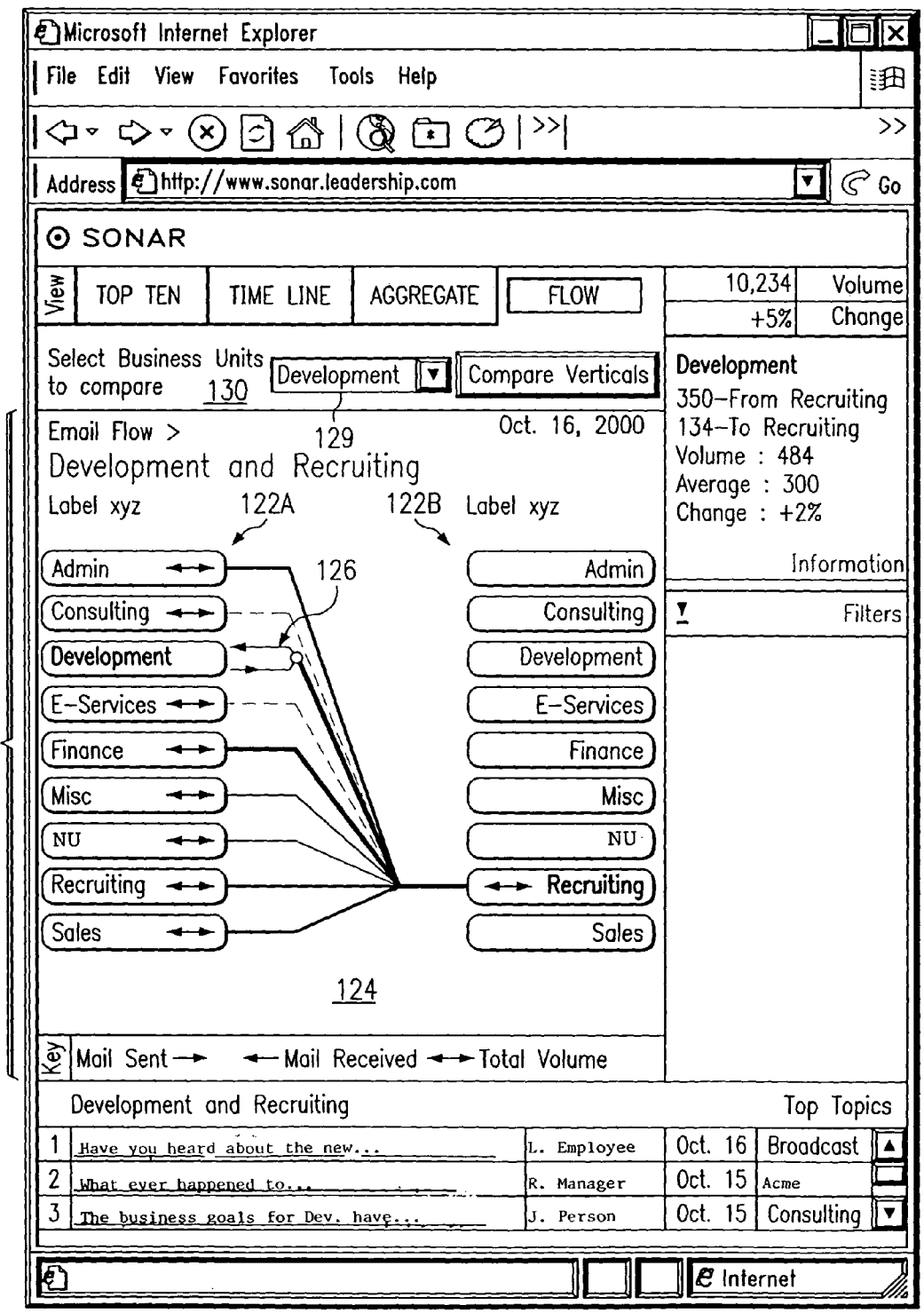
FIG. 7 depicts a GUI featuring an illustrative flow view.

With reference now to FIG. 7, a flow view 120 according to the example embodiment includes a flow visualization 127 with a first group of objects, such as labeled push buttons or boxes 122A, displayed in one portion of a presentation space 124 and a second group of objects, such as labeled boxes 122B, positioned in a separate area of presentation space 124.

Figure 8E:
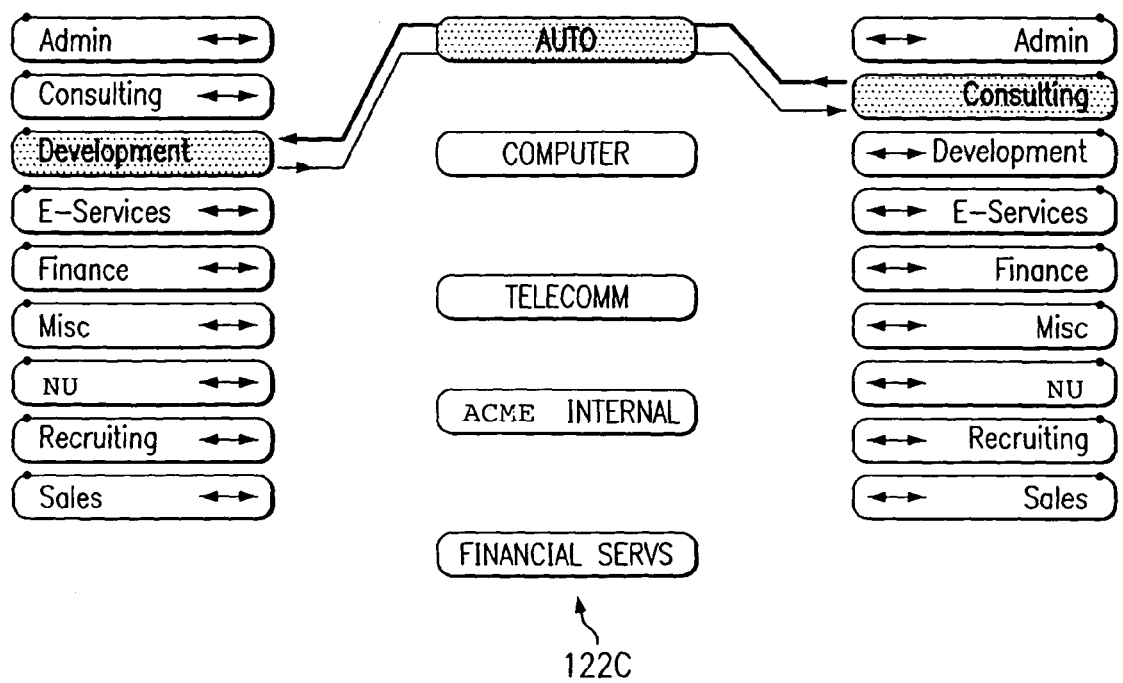
FIGS. 8A-8E depict an illustrative flow visualization in a variety of different states.
Figure 8A:
Figure 8B:
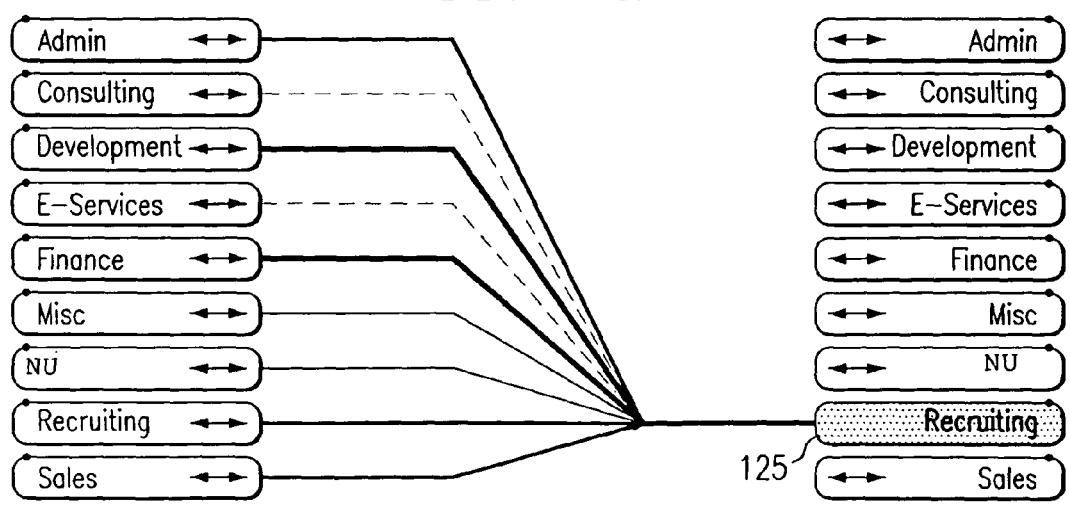

As shown in FIG. 8A, flow view 120 begins with two identical sets of objects that represent the organizational units of a company (e.g. Consulting, Development, Sales, etc.) The user selects an organizational unit from one of the columns, for example by clicking on the box 125 for that unit. In response, as depicted in FIG. 8B, presentation engine 32 highlights the selected box 125 and draws connecting lines or "pipes" to boxes in the other column for the units that have sent e-mail to or received e-mail from the selected unit. These lines represent the flow of information between units. The thickness of each line corresponds to the amount of e-mail that has passed between the units—the smaller the line, the smaller the aggregate flow of information. This visualization gives a user a quick picture of the flow between organizational units.

Figure 8C:
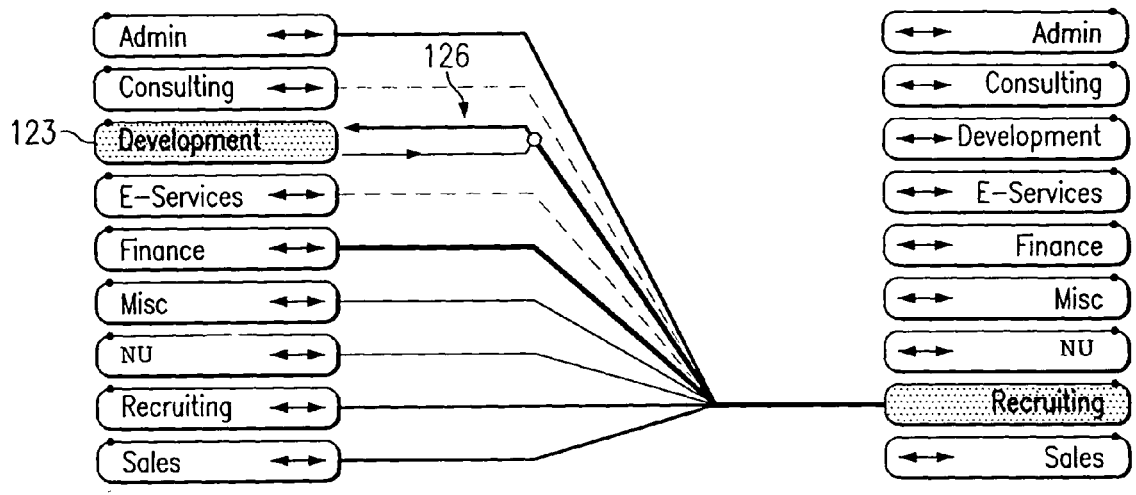

Presentation engine 32 also allows the user to adjust the focus the presentation to see a breakdown of the flow of information between units of a company. To drill down on the flow of information, the user activates or selects a box 123 for a particular unit or a particular line, for example by rolling a mouse pointer over that box or line. In response, part of the line leading to that box 123, or part of the elected line, is divided into smaller lines 126 that respectively represent e-mail flow into and out of box 123, as shown in FIGS. 7 and 8C.

Figure 8D:
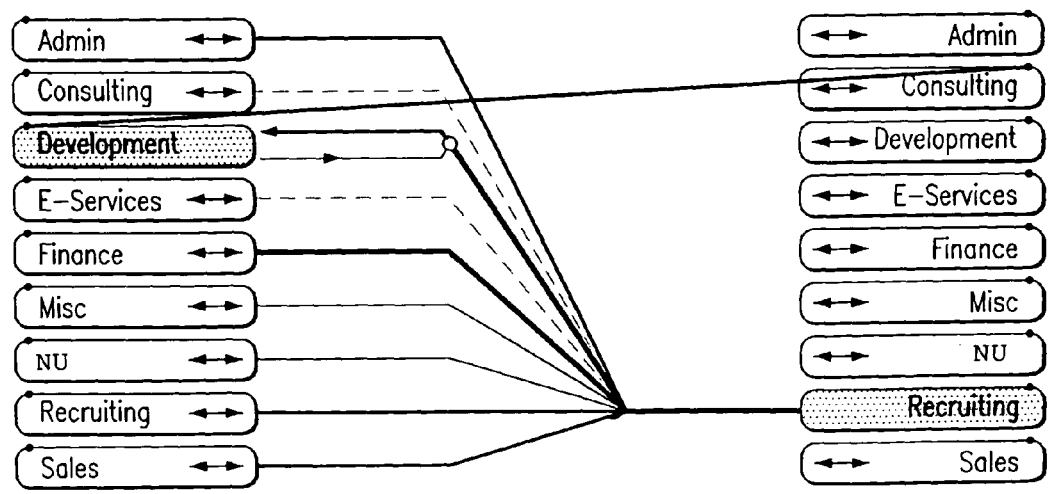

The user can further drill down to obtain more detailed information by selecting two containers, one in each of the groups of objects 122A and 122B. For example, as depicted in FIG. 8D, two containers can be selected by clicking and dragging from one container to another. Presentation engine 32 responds to two containers being selected by displaying a third group of containers 122C between the first group and second group, as depicted in FIG. 8E. In the illustrated embodiment, third group 122C represents a company's vertical organizational units focused on particular industries, such as auto, computer, telecom, etc. (i.e. the company's "industry verticals"). This configuration allows the user to quickly determine whether or not two horizontal units are communicating about a particular industry vertical.

In alternative embodiments, other characteristics of the information flow are depicted. For example, with reference to FIG. 8E, if the user would continue to drill down into "Auto," presentation engine 32 may display the projects listed under Auto. If the user drills down to a project level, presentation engine 32 may display teams or individuals. The hierarchy of categories is dependant on the organizational structure of the company.

In addition, flow view 120 includes other features like those in the other views, such as passive controls 130 that include a selection box or drop-down box 129 to modify the categories used for the first, second and/or third groups of objects. For example, in the visualization pictured, if the user were to select "Development" from drop-down box 129 and click "Compare Verticals," the graph would re-articulate to highlight Development in the right-hand side list.

Figure 9:
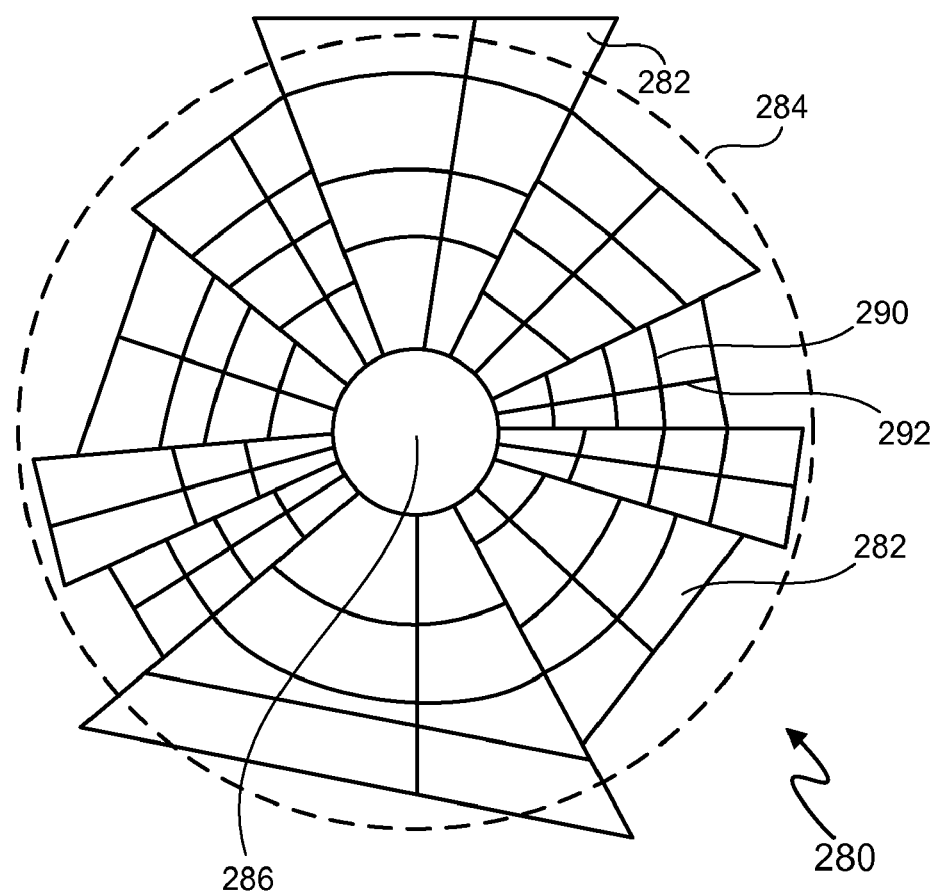
FIG. 9 depicts a GUI featuring an alternative radial view.

Referring now to FIG. 9, in an alternative radial view, a plane figure 280 includes multiple wedges or slices 282 representing subsets of a set of data items, such as a group of documents or e-mail messages for different business units. Plane figure 280 also features a line 284 which depicts the average quantity of documents for each of the slices. For example, the distance between line 284 and a center point 286 of plane figure 280 may represent the average total volume of e-mail traffic for each business unit. In addition, each slice 282 has its own individual radius, and each such slice radius may represent the volume of e-mail for that wedge within a predetermined timeframe. Additional lines 290 and 292 may be used to partition the interior volume of each slice into at least first and second areas to represent different subsets of documents within each slice.

CONCLUSION

As has been described, various embodiments of the present invention relate to visualizations that are rich in meaning yet simple to understand and to a user interface that provides a consistent window for those visualizations. The visualizations are provided by components executing within one or more data processing systems, which may include, without limitation, personal computers, mini computers, mainframe computers, and distributed computing systems.

Although one or more example embodiments or implementations of the present invention have been described in detail, it should be understood that various changes and substitutions can be made without departing from the spirit and scope of the invention. For example, FIG. 1 depicts data mining system 24 as residing within server data processing system 22, with input received from, and output sent to, client data processing system 20.

Figure 10:
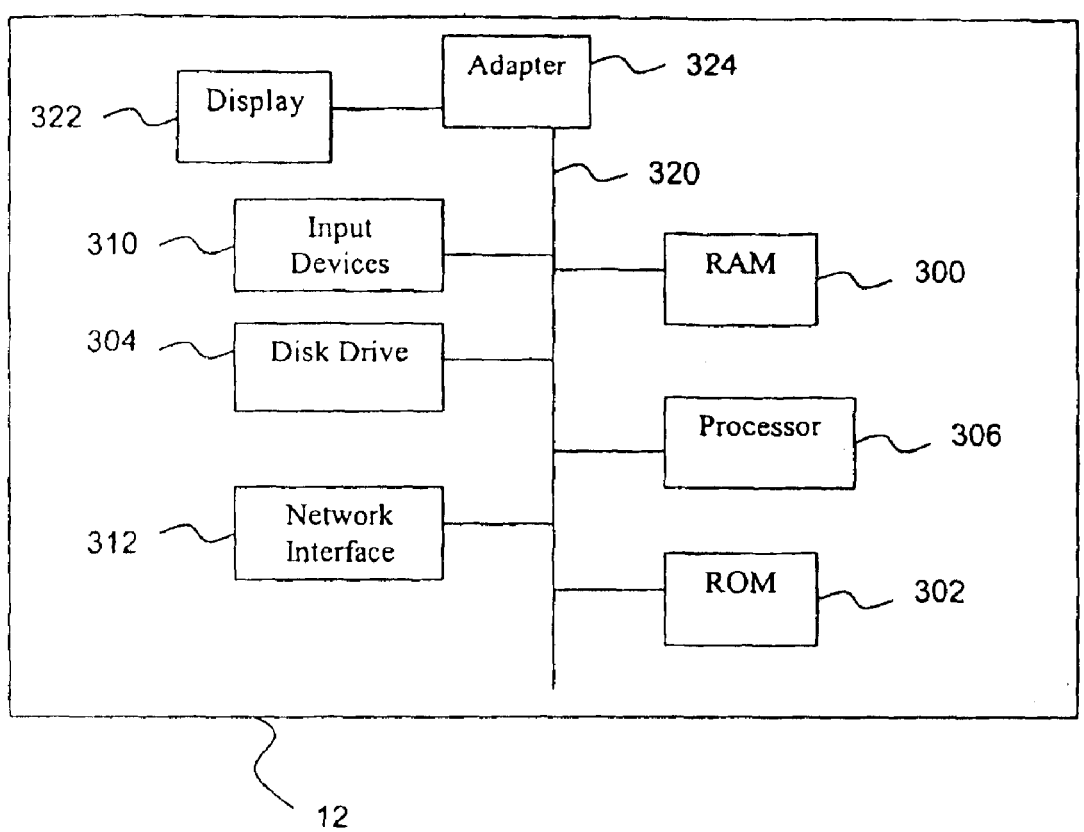
FIG. 10 presents a block diagram of an example data processing system.

With reference to FIG. 10, the processing resources within server data processing system 22 and client data processing system 20 may include data storage, such as read only memory (ROM) 300, random access memory (RAM) 302, one or more hard disk drives 304, CD-ROM drives, etc., and one or more central processing units (CPUs) 306. The processing resources may also include input devices 310, such as a keyboard and a pointing device, as well as one or more network interfaces 312, such as Ethernet ports. A display 322 may also be provided, along with a display adapter 324 for driving display 322. One or more buses 320 may be used to interconnect the various processing resources. The control logic and data constructs of data mining system 24 may be stored in nonvolatile data storage, such as in the one or more hard disk drives 304, with some or all of data mining system 24 then loaded into RAM 300 to facilitate execution on the one or more CPUs 306.

However, it should be understood that the present invention may also be implemented in numerous other hardware environments. Data processing systems incorporating the invention may include, without limitation, personal computers, mini computers, mainframe computers, and distributed computing systems. Furthermore, all of the components of the data mining system need not reside on the same data processing system. Moreover, some or all of the external systems, such as the client Web browser, could reside on the same data processing system as the data mining system.

In addition, alternative embodiments of the invention include computer-usable media encoding logic such as computer instructions for performing the operations of the invention. Such computer-usable media may include, without limitation, storage media such as floppy disks, hard disks, CD-ROMs, read-only memory, and random access memory; as well as communications media such as wires, optical fibers, microwaves, radio waves, electrical signals, and other electromagnetic and/or optical carriers.

It will also be recognized by those skilled in the art that embodiments of the radial graph and plane figure graph also include presentations using three dimensional presentation techniques, such as shadowing and embossing. It will also be recognized by those skilled in the art that embodiments of the graphs and displays described herein may easily be adapted into three dimensional displays using the appropriate application and display technology that allows for the generation and display of three dimensional objects. The three dimensional displays could also be manually manipulated to display the desired orientation. For example, graphs could be presented as spheres with conic or pyramid slices.

The scope of the invention is therefore not limited to the particulars of the example embodiment but is defined by the appended claims.

What is claimed is:

1. A method for presenting, in a radial graph, statistics relating to messages, the method comprising:
    performing with a computer system:
        displaying a ring having a ring radius, the ring radius representing an average quantity of messages for units of an organization; and
        displaying multiple wedges to categorize the messages according to the units and to reflect changes in message quantity for the units over time;
    wherein each wedge has a wedge radius that differs from the ring radius in proportion to a difference in the message quantity for that wedge for a predetermined timeframe, relative to the average quantity.

2. The method of claim 1, wherein:
    the predetermined timeframe identifies a portion of a default timeframe;
    the ring radius represents the average quantity for the default timeframe; and
    the wedge radius for each wedge represents the message quantity for that wedge for the predetermined timeframe.

3. The method of claim 1, further comprising:
    displaying a first sub-wedge within each wedge to represent a percentage of the messages for that wedge which were sent during the predetermined timeframe;
    displaying a second sub-wedge within each wedge to represent a percentage of the messages for that wedge which were received during the predetermined timeframe; and
    displaying a set of sections within each of the wedges to categorize the messages for that wedge according to importance.

4. The method of claim 3, wherein displaying a set of sections within each of the wedges comprises displaying multiple radial bands within each wedge to represent different importance values for subsets of the messages for that wedge.

5. The method of claim 4, wherein the importance values are based on ages associated with the messages, with older messages deemed less important than more recent messages.

6. A method for depicting, in a radial graph, statistics for a set of data items, the method comprising:
    performing with a computer system:
        displaying multiple wedges representing respective base subsets of the set of data items, the number of wedges based on distinct values for a first attribute of the data items; and
        displaying a ring having a ring radius, the ring radius representing a measure for a common base category to which all of the base subsets are referenced;
    wherein each wedge has a wedge radius and a radial width;
    wherein a subsidiary subset of at least one base subset excludes data items from that base subset based on a second attribute of the data items in that base subset; and
    wherein the wedge radius for at least one wedge differs from the ring radius in proportion to a difference between the measure for the corresponding base subset and a measure for the subsidiary subset.

7. The method of claim 6, wherein:
    the first attribute is a category attribute;
    the radial width of the at least one wedge represents an aggregate measure for the associated base subset, in proportion to an aggregate measure for the set of data items;
    the ring radius represents a normalized measure for the at least one base subset;
    the second attribute is a time attribute;
    the subsidiary subset is a temporal subset of the at least one base subset, such that the temporal subset excludes data items from the at least one base subset, based on the time attribute; and
    the wedge radius for the at least one wedge differs from the ring radius in proportion to a difference between the normalized measure for the at least one base subset and an aggregate measure for the temporal subset.

8. The method of claim 7, wherein the temporal subset is based on a predetermined timeframe, such that the temporal subset includes the data items from the associated base subset only if those data items have time values that fall within the predetermined timeframe.

9. The method of claim 7, wherein:
    the data items represent e-mail messages of members of an organization; and
    the category attribute relates to organizational units of the organization.

10. The method of claim 7, wherein:
    the multiple wedges represent a first categorization of the data items;
    the data items also have a supplementary attribute; and
    the method further comprises displaying multiple sections within at least one of the multiple wedges to represent a second categorization of the data items, the second categorization based on the supplementary attribute.

11. The method of claim 10, wherein the supplementary attribute relates to delivery directions for the data items.

12. The method of claim 10, wherein displaying the multiple sections comprises displaying sub-wedges within at least one of the multiple wedges.

13. The method of claim 10, wherein the supplementary attribute relates to importance values for the data items.

14. The method of claim 10, wherein displaying the multiple sections comprises displaying multiple radial bands within at least one of the multiple wedges.

15. The method of claim 14, wherein displaying multiple radial bands comprises displaying an inner radial band and an outer redial band, such that data items associated with the outer radial band have less importance, relative to data items associated with the inner radial band.

16. The method of claim 6, further comprising:
displaying a first ordered list of topics in a user interface with the radial graph, the first ordered list derived from the set of data items; and
in response to selection of one of the wedges, replacing the first ordered list of topics with a second ordered list of topics, the second ordered list derived from the base subset associated with the selected wedge.

17. The method of claim 6, further comprising:
displaying a filter option; and
in response to user activation of the filter option, updating the radial graph according to the activated filter option.

18. A method of presenting statistics relating to information flow using a computer system, the method comprising:
performing with the computer system:
displaying first and second groups of objects in respective first and second areas of a presentation space;
in response to activation of a first object in the first group, displaying a first line between the first object and a second object in the second group to represent a flow of information between the first object and the second object; and
in response to activation of the second object:
displaying a third group of objects in a third area of the presentation space generally between the first area and the second area;
displaying a second line between a third object in the third group and the first object; and
displaying a third line between the third object and the second object, such that the third object depicts a characteristic of the flow of information between the first object and the second object.

19. The method of claim 18, wherein displaying a first line between the first object and the second object comprises displaying two or more lines between the first object and two or more objects in the second group to represent two or more flows of information.

20. The method of claim 18, further comprising, in response to activation of a fourth object in the first group, displaying a fourth line between the fourth object and a fifth object in the second group, in lieu of the second and third lines, to represent a flow of information between the fourth object and the fifth object.

21. The method of claim 18, further comprising:
receiving user input requesting a radial view and, in response to the user input:
displaying multiple wedges to represent a first categorization of data; and
displaying a ring having a ring radius, the ring radius representing a normalized measure of each of the multiple wedges;
wherein at least one of the wedges has a wedge radius that differs from the ring radius.

22. A computer readable storage medium for presenting a radial graph that represents statistics for data items, the computer readable storage medium comprising:
computer instructions, encoded in the computer readable storage medium, that are executable by one or more processors to perform operations including:
displaying a ring having a ring radius, the ring radius representing a predetermined measure for a common base category associated with the data items of respective units; and
displaying multiple slices to categorize the data items according to the units and to reflect changes, over time, in aggregate quantities of data items for the units; and
wherein each slice has a slice radius that differs from the ring radius in proportion to a difference from the predetermined measure for that slice for a predetermined timeframe, relative to the predetermined measure.

23. The computer readable storage medium of claim 22, wherein:
the predetermined timeframe identifies a portion of a default timeframe;
the ring radius represents the average quantity for the default timeframe; and
the slice radius for each slice represents the message quantity for that slice for the predetermined timeframe.

24. The computer readable storage medium of claim 22, wherein the computer readable storage medium further encodes computer instructions that are executable by one or more processors to perform operations comprising:
displaying a first sub-slice within each slice to represent a percentage of the messages for that slice which were sent during the predetermined timeframe;
displaying a second sub-slice within each slice to represent a percentage of the messages for that slice which were received during the predetermined timeframe; and
displaying a set of sections within each of the slices to categorize the messages for that slice according to importance.

25. A computer readable storage medium for depicting, in a radial graph, statistics for a set of data items, the computer readable storage medium comprising:
computer instructions, encoded in the computer readable storage medium, that are executable by one or more processors to perform operations including:
displaying multiple wedges representing respective base subsets of the set of data items, the number of wedges based on distinct category attributes of the data items, each wedge having a wedge radius and a radial width, the radial width representing an aggregate measure for the associated base subset in proportion to an aggregate measure for the set of data items; and
displaying a ring having a ring radius, the ring radius representing a normalized measure for a common base category applicable to all of the base subsets;
wherein a temporal subset of at least one base subset excludes data items from that base subset based on time attributes of the data items in that base subset; and
wherein the wedge radius for at least one wedge differs from the ring radius in proportion to a difference between the normalized measure for the corresponding base subset and an aggregate measure for the temporal subset.

26. The computer readable storage medium of claim 25, wherein the temporal subset is based on a predetermined timeframe, such that the temporal subset includes the data items from the associated base subset only if those data items have time attributes that fall within the predetermined timeframe.

27. The computer readable storage medium of claim 25, wherein:
the multiple wedges represent a first categorization of the data items;
each of the data items also has a supplementary attribute; and the computer readable storage medium further encodes computer instructions that are executable by one or more processors to display multiple sections within at least one of the multiple wedges to represent a second categorization of the data items, the second categorization based on the supplementary attributes.

28. The computer readable storage medium of claim 27, wherein displaying the multiple sections comprises displaying sub-wedges within at least one of the multiple wedges.

29. The computer readable storage medium of claim 27, wherein displaying the multiple sections comprises displaying multiple radial bands within at least one of the multiple wedges.

30. The computer readable storage medium of claim 29, wherein displaying multiple radial bands comprises displaying an inner radial band and an outer redial band, such that data items associated with the outer radial band have less importance, relative to data items associated with the inner radial band.

31. The computer readable storage medium of claim 25, wherein the operations performed by the computer instructions further comprise:
displaying a first ordered list of topics in a user interface with the radial graph, the first ordered list derived from the set of data items; and
in response to selection of one of the wedges, replacing the first ordered list of topics with a second ordered list of topics, the second ordered list derived from the base subset associated with the selected wedge.

32. The computer readable storage medium of claim 25, wherein the operations performed by the computer instructions further comprise:
displaying a filter option; and
in response to user activation of the filter option, updating the radial graph according to the activated filter option.

33. A computer readable storage medium for presenting statistics relating to information flow, the computer readable storage medium comprising:
computer instructions, encoded in the computer readable storage medium, that are executable by one or more processors to perform operations including:
displaying first and second groups of objects in respective first and second areas of a presentation space;
in response to activation of a first object in the first group, displaying a first line between the first object and a second object in the second group to represent a flow of information between the first object and the second object; and
in response to activation of the second object:
displaying a third group of objects in a third area of the presentation space generally between the first area and the second area;
displaying a second line between a third object in the third group and the first object; and
displaying a third line between the third object and the second object, such that the third object depicts a characteristic of the flow of information between the first object and the second object.

34. The computer readable storage medium of claim 33, wherein displaying a first line between the first object and the second object comprises displaying two or more lines between the first object and two or more objects in the second group to represent two or more flows of information.

35. The computer readable storage medium of claim 33, wherein the operations performed by the computer instructions further comprise responding to activation of a fourth object in the first group by displaying a fourth line between the fourth object and a fifth object in the second group, in lieu of the second and third lines, to represent a flow of information between the fourth object and the fifth object.

36. A data processing system comprising:
a processor; and
a memory, coupled to the processor, having code stored therein to cause the processor to generate data for displaying a radial graph depicting statistics for a set of data items, each data item having a category attribute and a time attribute, the radial graph comprising:
multiple wedges representing respective base subsets of the set of data items, the number of wedges based on distinct category attributes of the data items, each wedge having a radial width representing an aggregate measure for the associated base subset in proportion to an aggregate measure for the set of data items; and
a ring having a ring radius, the ring radius representing a normalized measure for a common base category to which all of the base subsets are referenced;
wherein a temporal subset of at least one base subset excludes data items from that base subset based on the time attributes of the data items in that base subset; and
wherein one wedge among the multiple wedges represents the temporal subset, the one wedge having a wedge radius that differs from the ring radius in proportion to a difference between the normalized measure for the corresponding base subset and an aggregate measure for the temporal subset.

37. A data processing system for presenting a radial graph that represents statistics for data items, the data processing system comprising:
a presentation manager that:
displays a ring having a ring radius, the ring radius representing a predetermined measure for a common base category associated with the data items of respective units; and
displays multiple wedges to categorize the data items according to the units and to reflect changes, over time, in a measurement of data items for the units;
wherein each wedge has a wedge radius that differs from the ring radius in proportion to a difference in the measurement of data items for that wedge for a predetermined timeframe, relative to the predetermined measure.

38. A data processing system for presenting statistics relating to information flow, the data processing system comprising:
a presentation manager that:
displays first and second groups of objects in respective first and second areas of a presentation space;
in response to activation of a first object in the first group, displays a first line between the first object and a second object in the second group to represent a flow of information between the first object and the second object; and
in response to activation of the second object:
displays a third group of objects in a third area of the presentation space generally between the first area and the second area;
displays a second line between a third object in the third group and the first object; and
displays a third line between the third object and the second object, such that the third object depicts a characteristic of the flow of information between the first object and the second object.

39. A method for presenting, in a radial graph, statistics relating to data items, the method comprising:
performing with a computer system:
displaying multiple wedges to categorize a set of data items into subsets of data items; and
displaying a ring having a ring radius, the ring radius representing a predetermined measure for a common base category for at least two wedges among the multiple wedges;
wherein the at least one wedge has a wedge radius that differs from the ring radius in proportion to a difference in a measurement of data items for the at least two wedges for a predetermined timeframe, relative to the predetermined measure.

40. A method for presenting, in a plane figure, statistics, the method comprising:
performing with a computer system:
displaying multiple wedges to categorize a set of data items into base subsets of data items, such that at least two of the wedges correspond to respective base subsets; and
displaying a continuous boundary that surrounds at least a portion of each of the wedges, wherein the boundary is disposed from a center point, the disposition representing a measure for a common base category for the base subsets corresponding to the at least two wedges;
wherein each wedge has a wedge outer boundary, wherein the wedge outer boundary opposes the center point; and
wherein the distance along the continuous boundary that separates the continuous boundary from the center point differs from the wedge outer boundary in proportion to a difference between the measure for the at least one base subset and a measure for a subsidiary subset of that base subset.

41. The method of claim 40, wherein:
the data items comprises documents;
the distance separating the boundary from the center point represents an average quantity of documents in the at least one base subset;
the subsidiary subset only includes documents with values for a time attribute that fall within a predetermined timeframe; and
the distance separating the continuous boundary from the center point differs from the wedge outer boundary in proportion to a difference between the average quantity of documents in the at least one base subset and an aggregate quantity of documents in the subsidiary subset.

42. The method of claim 40, wherein:
the at least one wedge surrounds an interior volume; and
the method further comprises displaying at least one dividing boundary within the at least one wedge to separate the interior volume into at least first and second areas, such that the at least first and second areas represent respective first and second subsets of the at least one base subset.

43. A system for presenting a radial graph that represents statistics for data items, the system comprising:
means for displaying in a computer system a categorization of data in a radial graph;
means for reflecting changes in values of the data over time using wedges in the radial graph; and
means for visually surrounding at least a portion of each wedge in the radial graph with a boundary that represents a predetermined measure for a common base category relative to each respective categorization of data of each wedge.

44. The computer readable storage medium of claim 22 wherein the predetermined measure represents an average quantity of data items associated with units of an organization.

45. The method of claim 1 wherein displaying a ring having a ring radius further comprises displaying a non-solid ring having a ring radius.

46. The method of claim 45 wherein displaying a non-solid ring having a ring radius further comprises displaying a dashed ring having a ring radius.

47. The method of claim 1 wherein displaying a ring having a ring radius further comprises displaying a solid ring having a ring radius.

48. The method of claim 40 wherein displaying a continuous boundary further comprises displaying a non-solid continuous boundary.

49. The method of claim 40 wherein displaying a continuous boundary further comprises displaying a solid continuous boundary.

\* \* \* \* \*